Dec. 21, 1943.   B. C. HASKIN   2,337,327
COMPOSITE PHOTOGRAPHY
Filed March 11, 1941   2 Sheets-Sheet 1
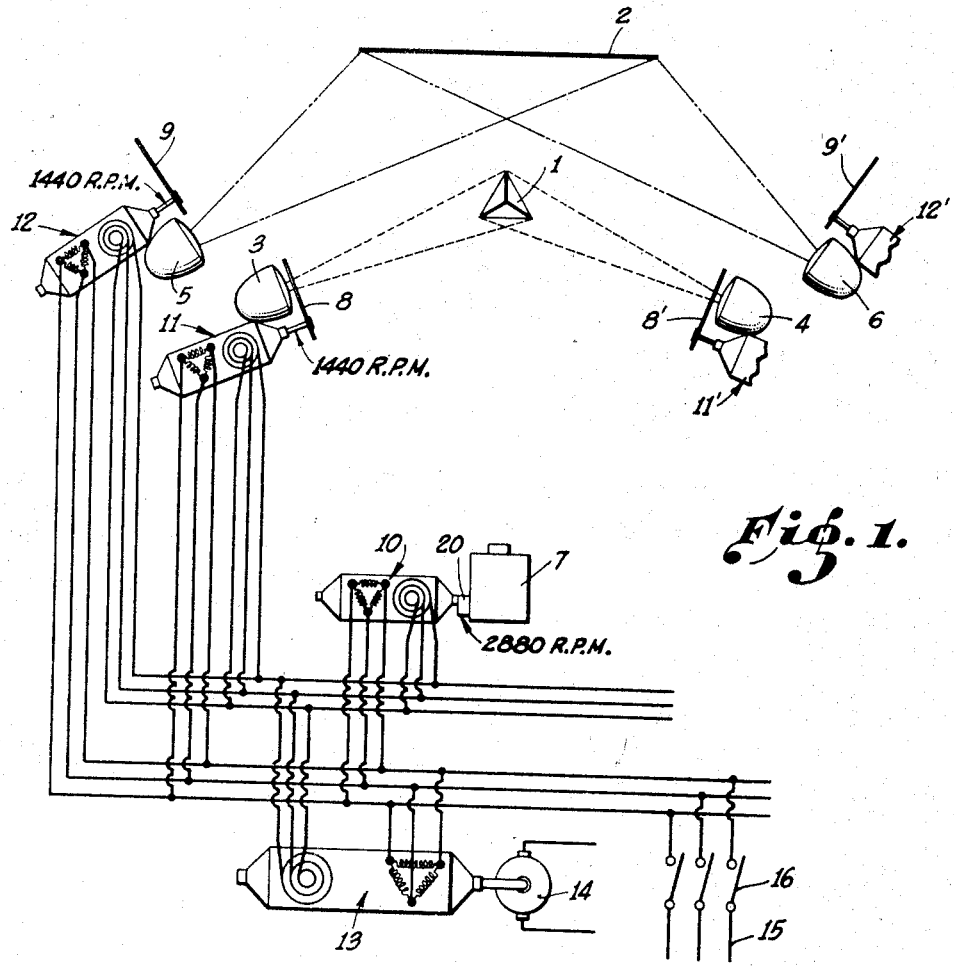
*Fig. 1.*
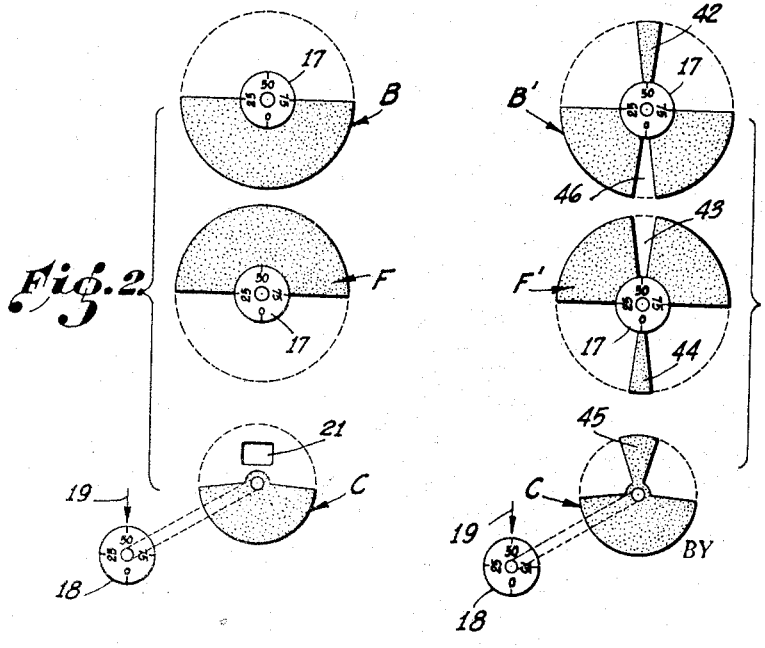
*Fig. 2.*    *Fig. 3.*
INVENTOR.
BYRON C. HASKIN,
BY
ATTORNEY.

Dec. 21, 1943.  B. C. HASKIN  2,337,327
COMPOSITE PHOTOGRAPHY
Filed March 11, 1941    2 Sheets—Sheet 2
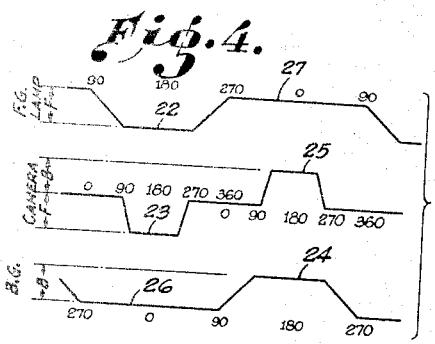
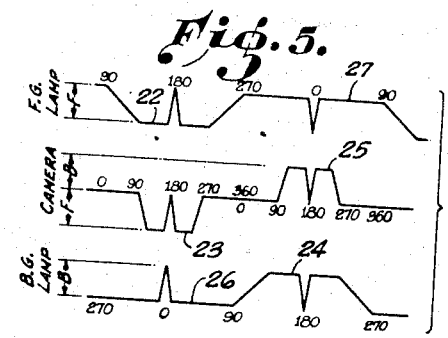
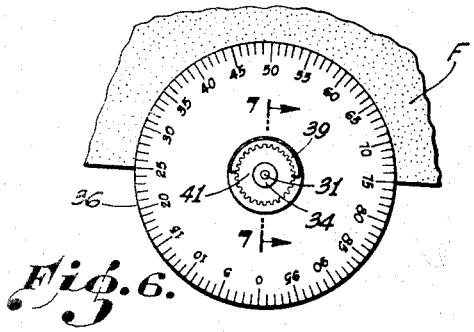
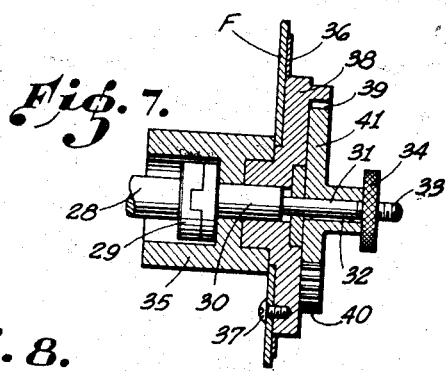
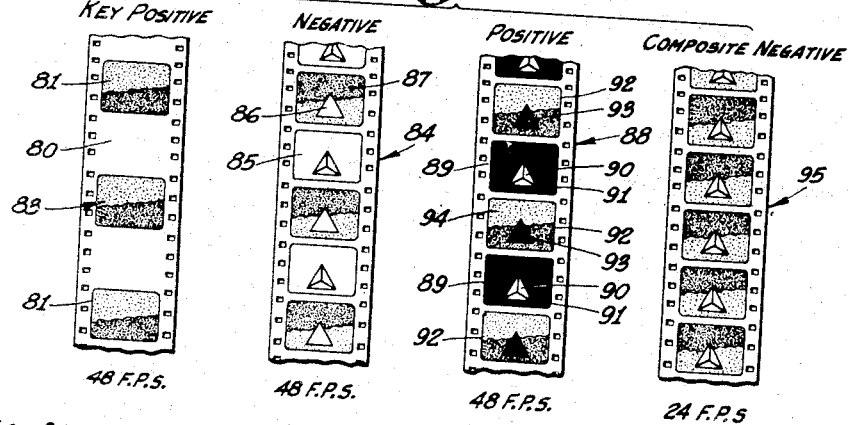
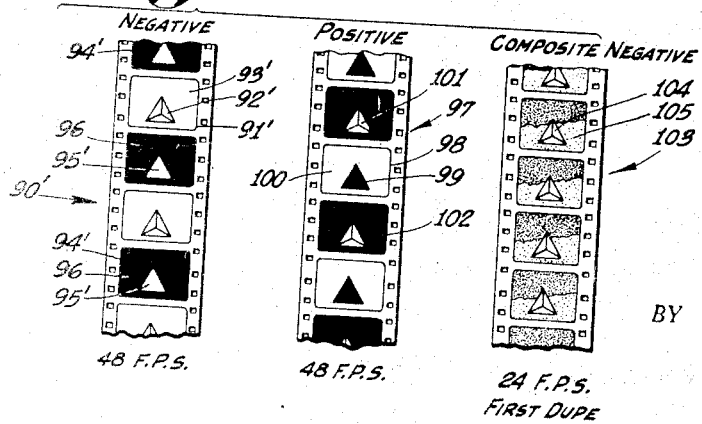
INVENTOR.
BYRON C. HASKIN,
BY
W. W. Beatty
ATTORNEY.

Patented Dec. 21, 1943

2,337,327

UNITED STATES PATENT OFFICE 2,337,327

COMPOSITE PHOTOGRAPHY

Byron C. Haskin, Beverly Hills, Calif., assignor to Warner Bros. Pictures, Inc., New York, N. Y., a corporation of Delaware Application March 11, 1941, Serial No. 382,786

1 Claim. (Cl. 88—16)

This invention relates to composite photography wherein a photograph of a foreground scene is combined with a photograph of a background scene in such a manner as to make it appear that the foreground was in fact, photographed at the situs of the background. There are known methods for accomplishing this, such as the traveling matt method according to which a photograph is prepared of the foreground action, and a print is taken from this to prepare a matt, for printing a hole in a background, whereby the foreground can be printed in that hole.

In the above matt process, the foreground and the matt appear on separate films which usually shrink different amounts, thereby making it difficult to match the matt and its print. This is overcome according to the present invention by arranging the foreground picture and its matt on the same film whereby shrinkage is equally effective on both.

Also according to the prior matt process, the foreground is associated with its background scene in a later printing operation. An object of the present invention is to print the background image concurrently with photographing the foreground action. Another object of the invention is to accomplish this while photographing the foreground action on certain frames wherein the background is not printed, so that these foreground images can be associated with a different set of background images, which makes it unnecessary to recall the actors to the set if it should be decided to depict the action as appearing before some background other than the one which was printed concurrently with the photographing of the foreground action.

According to another feature of the invention, the printed image of the background scene, and the photograph of the foreground action are produced separately on the same film while photographing the action, by the use of a lighting arrangement which alternately illuminates the foreground and a plain ground or screen behind it.

A further object of the invention relates to increasing the frequency of occultation so that it will not be annoying to the people who are within the field of the lights being occulted.

A further feature of the invention relates to interlocking and adjusting the screen and foreground occulting means into proper phase relation with each other and with the camera.

For further details of the invention reference may be made to the drawings wherein Fig. 1 is a schematic plan view of an arrangement for producing composite motion pictures according to the present invention.

Fig. 2 is a schematic view illustrating an arrangement of the occulting shutters, with respect to the camera shutter.

Fig. 3 is a modification of Fig. 2 illustrating shutter arrangements for increasing the speed of occultation.

Fig. 4 is a set of curves illustrating the occultation of light with the shutter arrangement of Fig. 2.

Fig. 5 is a set of curves illustrating the occultation of light obtained with the shutter arrangement of Fig. 3.

Fig. 6 is a plan view of an adjustable indicator for varying the setting of the occulting shutters.

Fig. 7 is a sectional view on line 7—7 of Fig. 6.

Fig. 8 represents a series of films used in and produced by the method and apparatus of Fig. 1 according to one plan.

Fig. 9 illustrates a series of films used in and produced by the method and apparatus of Fig. 1 according to another plan.

Referring in detail to the drawings, the foreground action 1, with associated foreground scenery if desired, is arranged in front of a white reflecting screen 2. The foreground 1 is illuminated by white light from the lamps 3 and 4 which do not illuminate the screen 2, and the latter is illuminated by white light from lamps 5 and 6 which do not illuminate the foreground 1. The foreground 1 and the screen 2 are alternately illuminated while the action 1 is photographed in front of screen 2 by means of the camera 7 which operates at double the speed of rotatable shutters 8, 9 which alternately occult the light from lamps 3 and 5 respectively. A rotatable shutter 8' is provided for lamp 4 and operates in synchronism with shutter 8. Also, a rotatable shutter 9' is provided for lamp 6 and it operates in synchronism with shutter 9.

Camera 7 is driven by a three phase motor 10, shutter 8 by a three phase motor 11, and shutter 9 by a three phase motor 12. Shutters 8' and 9' are driven by three phase motors 11' and 12', the circuits for which are similar to those shown for motors 11 and 12. The motors 10, 11 and 12 are driven from a distributor 13 driven by a D. C. motor 14. A. C. power is supplied from the three phase line 15 through the switch 16 to the field windings of all the motors such as 10 to 13 and their rotors are interconnected as shown.

Two of the blades of switch 16 are closed, which supplies power to interlock the motors 10 to 13 and hold the rotors thereof stationary. In Fig. 2, the relative positions of the background shutter B, (illustrative of 9, 9') the foreground shutter F, (illustrative of 8, 8') and the camera shutter C are shown. Each of the background and foreground shutters 8, 8', 9, 9' is provided with an adjustable indicator 17 as shown in further detail in Figs. 6 and 7, so that the shutter can be adjusted to and locked in various angular positions with respect to its driving motor. The camera shutter C in Fig. 2 has a similarly graduated indicator 18 which rotates with it. Indicator 18 is provided with a suitable index reference point 19. When the motors 10 to 13 are interlocked with their rotors stationary, a reading is taken of the camera indicator 18, and then the background and foreground shutters B and F, Fig. 2, are adjusted to have the relative positions shown in Fig. 2, use being made of a plumb bob or other stationary index point for indicators 17. Thereafter the remaining blade of switch 16 is closed, with the result that the shutters B and F rotate in synchronism at a certain speed, while the camera 7 operates at double the speed, by reason of a gear drive 20 between the camera motor 10 and the camera 7. By this arrangement, the aperture 21 (Fig. 2) of the camera receives only steady light from either the foreground 1 or screen 2, as illustrated by the curves in Fig. 4. In that figure, the numbers on the horizontal axes indicate the angular extent, while the vertical axes of the top and bottom curves represent the variation of intensity of the foreground and background lamps respectively. the middle curve on the vertical axis illustrating the extent of opening of the camera aperture 21. The flat peak 22 of the top curve illustrates that the foreground lamp is at its maximum intensity throughout the interval that the aperture 21 is open as shown by the peak 23. At a later instant of time, the flat peak 24 representing uniform maximum intensity of the background lamp, shows that this maximum intensity is maintained throughout the interval that the camera aperture 21 is open as shown by the peak 25. Also, the straight line portion 26 on the bottom curve shows that the background lamp is cut off by its shutter when light from the foreground lamp is being admitted to the camera. Also, the straight line portion 27 on the horizontal axis of the top curve shows that the foreground lamp is cut off by its shutter, when light from the background lamp is admitted to the camera.

The adjustable coupling and indicator for each of the shutters 8—8', 9—9' is the same as that shown in Figs. 6 and 7 wherein for example, the details of the coupling device for the foreground shutter F are shown. The shaft of the foreground motor 11 is indicated at 28 in Fig. 7. This shaft is connected through a suitable coupling 29 to a reduced section 30 and to a further reduced section 31 which carries a key 32. The extremity of section 31 is threaded at 33 to receive the nut 34. The shaft 28 and its extensions 30 and 31 are rotatably mounted in a housing 35 suitably supported on the casing of the motor 11. The graduated indicator 36 which may be a paper sheet is glued to the front of blade F which is suitably secured by screws such as 37 to a rotatable bushing 38 carried in the housing 35. Bushing 38 carries a semicircular arcuate internal gear 39 adapted to match with the circular gear teeth 40 on the periphery of the gear 41 the bore of which slidably fits the key 32. To change the angular position of the shutter F with respect to the shaft 28, the nut 34 is backed off, thereby permitting the gear 41 to slide outwardly on key 32 until the teeth 40 are disengaged from the gear 39, whereupon the bushing 38 with the shutter F (and indicator 36) carried thereby may be rotated to the desired position, whereupon the gear 41 is moved inwardly into mesh with gear 39 and the nut 34 is turned to lock the gear 41 in the position shown in Fig. 7.

In order to occult each light a plurality of times for each film exposure, I modify the shutters as shown in Fig. 3, wherein each of the background shutters B' is provided with a sector opening 46 and a diametrically opposite sector blade 42. The foreground shutters as represented at F' are similarly provided with a sector opening 43 and a diametrically opposite sector blade 44. The openings 46 and 43 and the blades 42 and 44 are all of the same angular extent, and I provide the camera shutter C with a sector blade 45 which is double that angular extent, as the camera shutter operates at double the speed of the background shutters B' and the foreground shutters F'. The openings 46, 43 permit light from their respective lamps to illuminate their respective subjects 1, 2, while the blade 45 prevents the illumination which is permitted by openings 46 and 43 from reaching the film in the camera 7. In this way I increase the speed of occultation to a point where it is not annoying.

The apparatus above described may be employed in several ways to produce composite pictures. For example, I may take a background negative taken at 24 F. P. S. and print it in a step printer to double its number of frames, so that there are alternate clear frames 80 between the successive background frames 81 of the key positive 83 as shown in Fig. 8. This key positive film 83 I then run in the camera 7 in front of the usual negative and photograph the action 1 as explained above. The key positive 83 is threaded in the camera 7 so that when a clear space 80 is in front of the aperture, the shutters 8, 9, are in position to admit light from the foreground 1, but not from the plain ground 2. This results in exposing the negative 84 as shown in Fig. 8 wherein a normal negative image 85 of the foreground action appears on alternate frames, interspersed with other frames containing an unexposed portion 86 which is a silhouette of the foreposed 1, surrounded by an image 87 of the background scene, resulting from the fact that the light from the ground 2 serves to print the background scene on the key positive 83 around the foreground 1 which is dark. A positive print of the negative 84 is indicated at 88 wherein alternate frames such as 89 comprise normal images 90 of the foreground action surrounded by matts 91, while the remaining alternate frames such as 92 comprise matts 93 of the foreground action surrounded by the background scene 94. The matts 91 and 93 are complementary in shape. By the use of a step printer, the positive 88 may be used to print its alternate background scenes 94, onto successive frames of a film and then by a further operation in the step printer, the foreground images 90 may be printed into the portions protected by the matts 93, to produce the dupe negative 95 wherein the successive frames show successive kinematic phases of the foreground action with its associated background scene.

According to a modification, I do not run the key positive 83 in the camera, but merely thread it with the usual single negative film. When the lights 3—6 are occulted as above described, there results the exposures shown on film 90' in Fig. 9, wherein alternate frames such as 91' contain a normal negative image 92' of the foreground 1 surrounded by an unexposed field 93', while the remaining alternate frames 94', contain an exposed field 96 surrounding an unexposed portion 95' which is a silhouette of the foreground 1. A positive print of negative 90' appears as shown at 97 in Fig. 9 wherein alternate frames such as 98 contain a matt 99 of the foreground surrounded by a clear field 100, while the other frames of the pair have a normal positive image 101 of the foreground 1, surrounded by a matt 102 where the background scene is to appear. Matts 99 and 102 are complemental in shape. The positive 97 is run in a step printer with a background film and raw stock to print the background scene through alternate frames 98 onto successive frames of the raw stock. The film 97 and the raw stock are run a second time through the step printer to print the foreground into the background scene. The raw stock thus exposed, after development, is a dupe negative 103, each frame of which has the foreground image 104 surrounded by its background scene 105. If desired the films 83, 84 and 88 of Fig. 8, and films 90' and 97 of Fig. 9 may be used in other ways to produce composite films.

I claim:

Means for occulting light for composite photography comprising the combination of a foreground light shutter having a blade, a background light shutter having a blade, means for driving said shutters at the same speed in opposite phase, an opening in each of said blades and an auxiliary blade opposite each of said openings, a camera having a shutter blade, means for driving said camera shutter at twice the speed of said other shutters, said camera shutter blade having an auxiliary blade of twice the angular extent of the openings in said foreground and background shutter blades for preventing transmission of light through said camera shutter when light is transmitted by the openings in said light shutter blades.

BYRON C. HASKIN.